(12) United States Patent
Trncak et al.

(10) Patent No.: US 12,043,084 B2
(45) Date of Patent: Jul. 23, 2024

(54) FLUID PIPE FOR A HEATING AND AIR CONDITIONING UNIT

(71) Applicant: Hanon Systems, Daejeon (KR)

(72) Inventors: Zbynek Trncak, Koprivnice (CZ); Oldrich Kolarik, Ostrava-Poruba (CZ); Tomas Dockalek, Jesenik nad Odrou (CZ)

(73) Assignee: HANON SYSTEMS, Daejeon (KR)

( * ) Notice: Subject to any disclaimer, the term of this patent is extended or adjusted under 35 U.S.C. 154(b) by 395 days.

(21) Appl. No.: 17/428,763

(22) PCT Filed: Feb. 13, 2020

(86) PCT No.: PCT/KR2020/002057
§ 371 (c)(1),
(2) Date: Aug. 5, 2021

(87) PCT Pub. No.: WO2020/167002
PCT Pub. Date: Aug. 20, 2020

(65) Prior Publication Data
US 2022/0105780 A1 Apr. 7, 2022

(30) Foreign Application Priority Data
Feb. 15, 2019 (DE) .................... 10 2019 103 844.8

(51) Int. Cl.
| | |
|---|---|
| *F16L 9/12* | (2006.01) |
| *B60H 1/00* | (2006.01) |
| *F16L 9/128* | (2006.01) |
| *F16L 9/14* | (2006.01) |
| *F16L 13/16* | (2006.01) |
| *F16L 47/02* | (2006.01) |

(52) U.S. Cl.
CPC .......... *B60H 1/00571* (2013.01); *F16L 9/128* (2013.01); *F16L 9/14* (2013.01); *F16L 13/16* (2013.01); *F16L 47/02* (2013.01)

(58) Field of Classification Search
CPC .............. F16L 47/00; F16L 9/12; F16L 9/128
USPC ....... 138/109, 172, 173; 285/148.21, 148.14, 285/423
See application file for complete search history.

(56) References Cited

U.S. PATENT DOCUMENTS 1,837,103 A * 12/1931 Betz ........................ F16L 13/04
285/229
2,047,714 A * 7/1936 Smith ..................... F16L 33/16
285/402
(Continued)

FOREIGN PATENT DOCUMENTS

| CN | 1764802 A | 4/2006 |
| CN | 107687553 A | 2/2018 |

(Continued)

*Primary Examiner* — Patrick F Brinson
(74) *Attorney, Agent, or Firm* — Shumaker, Loop & Kendrick, LLP; James D. Miller

(57) ABSTRACT

A fluid pipe for a heating and air conditioning unit, exhibiting a pipe coupling section produced at least predominantly from plastic in the area of a mouth of the pipe, wherein a bead that is constructed from plastic and runs around the circumference of the pipe in the pipe coupling section and protrudes outward and wherein a circumferential ring that also runs around the circumference of the pipe and is produced from metal or a metal alloy is attached to the bead.

9 Claims, 3 Drawing Sheets

(56) References Cited

U.S. PATENT DOCUMENTS

| | | | | |
|---|---|---|---|---|
| 3,494,643 A | * | 2/1970 | Wilson | F16L 47/14 |
| | | | | 285/365 |
| 3,687,167 A | * | 8/1972 | Longshaw | F16L 47/14 |
| | | | | 138/109 |
| 3,715,800 A | * | 2/1973 | Leopold | F16L 19/04 |
| | | | | 29/523 |
| 3,823,216 A | * | 7/1974 | Petzetakis | F16L 47/08 |
| | | | | 264/296 |
| 3,994,515 A | * | 11/1976 | Cotten | B29C 66/12449 |
| | | | | 156/499 |
| 4,850,621 A | | 7/1989 | Umehara | |
| 5,191,916 A | | 3/1993 | Kanao | |
| 5,297,586 A | * | 3/1994 | McIntosh | F16L 33/207 |
| | | | | 138/121 |
| 5,622,394 A | * | 4/1997 | Soles | F16L 33/2076 |
| | | | | 285/259 |
| 6,016,842 A | * | 1/2000 | Rooke | F16L 33/26 |
| | | | | 138/120 |
| 6,851,723 B2 | * | 2/2005 | Usui | F16L 41/005 |
| | | | | 285/190 |
| 8,764,070 B2 | * | 7/2014 | Park | F16L 33/2076 |
| | | | | 285/382.4 |
| 2007/0108765 A1 | * | 5/2007 | Hayakawa | F16L 33/006 |
| | | | | 285/285.1 |

FOREIGN PATENT DOCUMENTS

| | | |
|---|---|---|
| CN | 108156818 A | 6/2018 |
| KR | 2019940010388 | 5/1994 |
| KR | 2019920021940 | 6/1994 |
| KR | 950005493 Y1 | 7/1995 |
| KR | 950007033 Y1 | 8/1995 |

\* cited by examiner

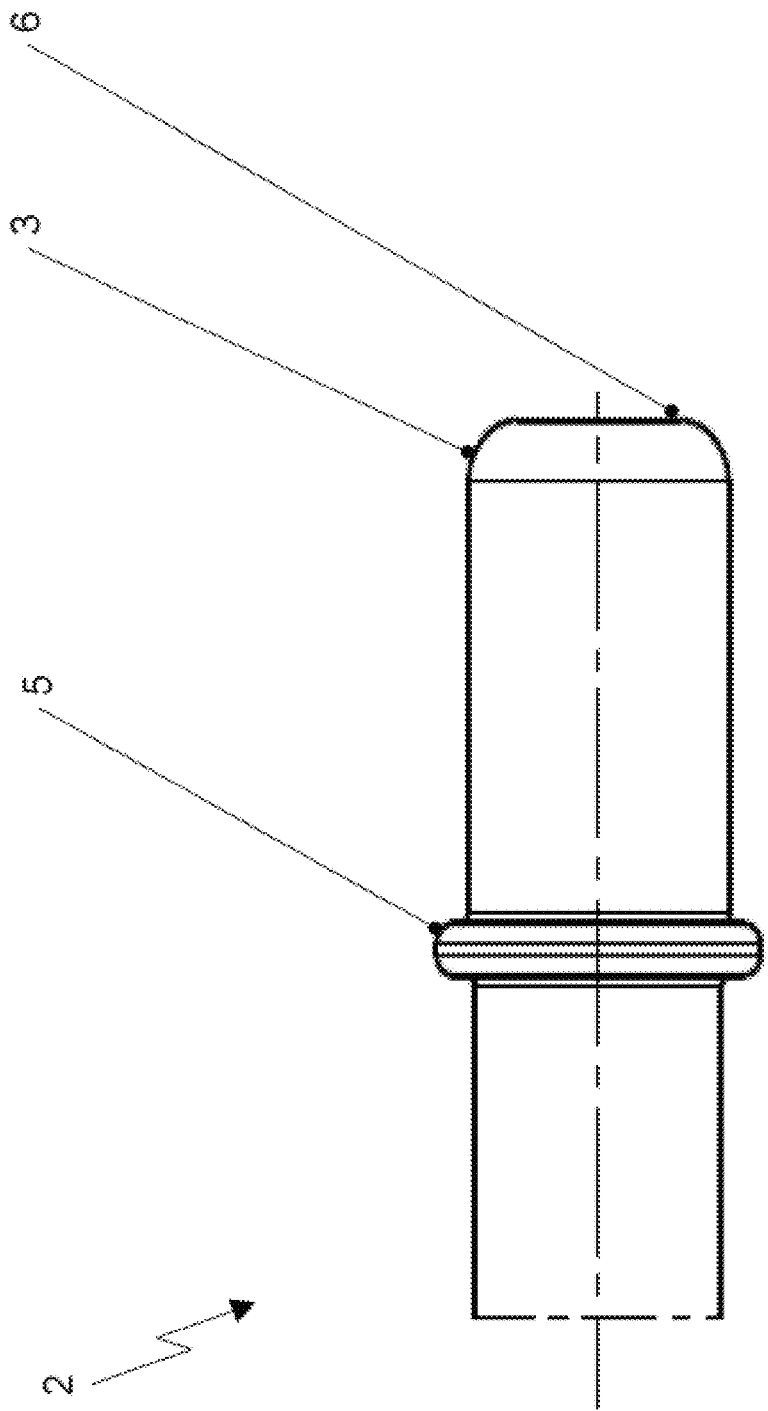

FLUID PIPE FOR A HEATING AND AIR CONDITIONING UNIT

CROSS-REFERENCE TO RELATED PATENT APPLICATIONS

This patent application is a U.S. national phase patent application based on PCT/KR2020/002057 filed on Feb. 13, 2020, which claims the benefit of German Patent Application No. DE 10 2019 103 844.8 filed on Feb. 15, 2019, the entire contents of both of which are hereby incorporated herein by reference.

TECHNICAL FIELD

The present invention relates to a fluid pipe for a heating and air conditioning unit, in particular in motor vehicles.

BACKGROUND ART

Plastic heating pipes, in other words heating pipes that are at least predominantly produced from a polymer material, represent the main area of application of the invention. These plastic pipes are increasingly superseding metallic pipes and pipe coupling sections, which are for example produced from aluminum. Fluid pipes produced from plastic that are connected to other units or pipes via flexible hoses, for example rubber hoses, are already known from the state of the art. Directly adjoining their outlet, plastic fluid pipes of this kind have a circumferential bead, which the flexible hose is slid over.

As a variation of this, DE 20 2004 000 045 U1 proposes that instead of equipping fluid pipes in the form of plastic-metal composite pipes with mouth-side circumferential flanges, they should instead be equipped with at least one circumferential bead protruding outwards that does not adjoin the outlet, but instead is set at a distance from the front edge of the mouth of the fluid pipe. To connect fluid pipes of this kind to one another or to connect fluid pipes to units of vehicles, an elastic hose is slid onto the pipe and over the bead.

DISCLOSURE OF INVENTION

The general problem with the use of polymer material is that the polymer material displays unstable behavior as the temperature and/or pressure increases. When using fluid pipes made of plastic with a pipe coupling that exhibits a bead for a connection to a quick connector, there is a risk, particularly at high temperatures and/or high pressures, that the bead, also made of plastic, often fails to exhibit sufficient stability to prevent undesirable disconnection of the bead from the quick connector. To prevent this, complex and costly precision manufacturing has been required to date.

The task underlying the invention focuses in particular on providing a pipe coupling section for a connection to a quick connector or for a different type of connection for fluid pipes that guarantees improved stability of the connection over the state of the art at high temperatures and high pressures.

The object of the invention is resolved by using a fluid pipe with the features as disclosed herein and suitable for a heating and air conditioning unit.

A fluid pipe according to the invention exhibits a pipe coupling section produced at least predominantly from plastic in the area of a mouth of the pipe, wherein a plastic bead that protrudes outwards is constructed around the circumference in the pipe coupling section and wherein a circumferential ring made of metal or a metal alloy is also attached to the plastic bead.

The root of the invention is the design of the at least predominantly plastic pipe coupling section, which is intended for connection to a quick connector or a different type of connector. According to the conceptual design of the invention, a ring made of metal or metal alloy is formed onto a polymer (i.e. plastic) bead of a polymer pipe in order to increase the stability of the pipe coupling section and thereby also the stability of the connection between the pipe coupling section and a quick connector or a different type of connector. In accordance with a particularly preferred embodiment of the invention, the ring is produced from aluminum or an aluminum alloy.

The ring, which is formed on the bead produced from a polymer material, increases the resilience of the pipe coupling section under various thermal and mechanical conditions to the necessary level in order to guarantee correct functioning of the bead even at high temperatures and high pressures. The fluid pipe produced at least predominantly from plastic can therefore be positioned in an area exposed to high temperatures and/or high pressures, meaning that the plastic material, in particular the bead produced from plastic, could potentially become unstable over time at the connection to a quick connector or a different type of connection. This allows an existing problem when using plastic pipes to be resolved.

The ring should preferably exhibit a cross section that matches the cross section of the bead in such a way that the ring encapsulates the bead precisely at least in part. The metallic ring can then, for example, exhibit an essentially U-shaped cross section.

It would be beneficial for the bead and the ring not to adjoin a front edge that itself adjoins the mouth of the pipe, but rather to be set at a distance from the front edge. In a beneficial embodiment of the invention, the mouth of the pipe is constructed in such a way that it is at least partially tapered relative to the other diameter of the pipe coupling section towards the limiting front edge.

According to one embodiment of the invention, the bead is constructed by reshaping the pipe wall in a reshaping area, wherein the bead that runs around the outer wall of the pipe is positioned opposite a circumferential recess in the inner wall of the pipe. The reshaping should preferably take the form of a fold, making the reshaping area a folding zone. The circumferential recess is constructed as a circumferential groove that also exhibits a circumferential central fold in the position of a maximum recess in the inner wall of the pipe. The position of the maximum recess in the inner wall of the pipe is opposite the position of a maximum bead diameter on the outer wall of the pipe, wherein the two surfaces are at least partially in contact with one another on both sides of the central fold at these adjoining areas of the circumferential groove. In one embodiment, in which the adjoining areas are in full contact with one another, the circumferential groove would comprise three circumferential parallel folds, wherein two outer folds on both sides of the central fold that also adjoin one another are constructed on the two outer edges of the circumferential groove.

According to an alternative embodiment of the invention, the bead that protrudes outwards is constructed as a thickening (reinforcement) of the pipe wall that runs around the circumference of the pipe.

BRIEF DESCRIPTION OF DRAWINGS

Further details, features and benefits of embodiments of the invention result from the following description of specimen embodiments with reference to the accompanying drawings.

These display the following:

FIG. 3: A schematic side view of the pipe coupling section of the fluid pipe.

DESCRIPTION OF EMBODIMENTS OF THE INVENTION

Figure 1:
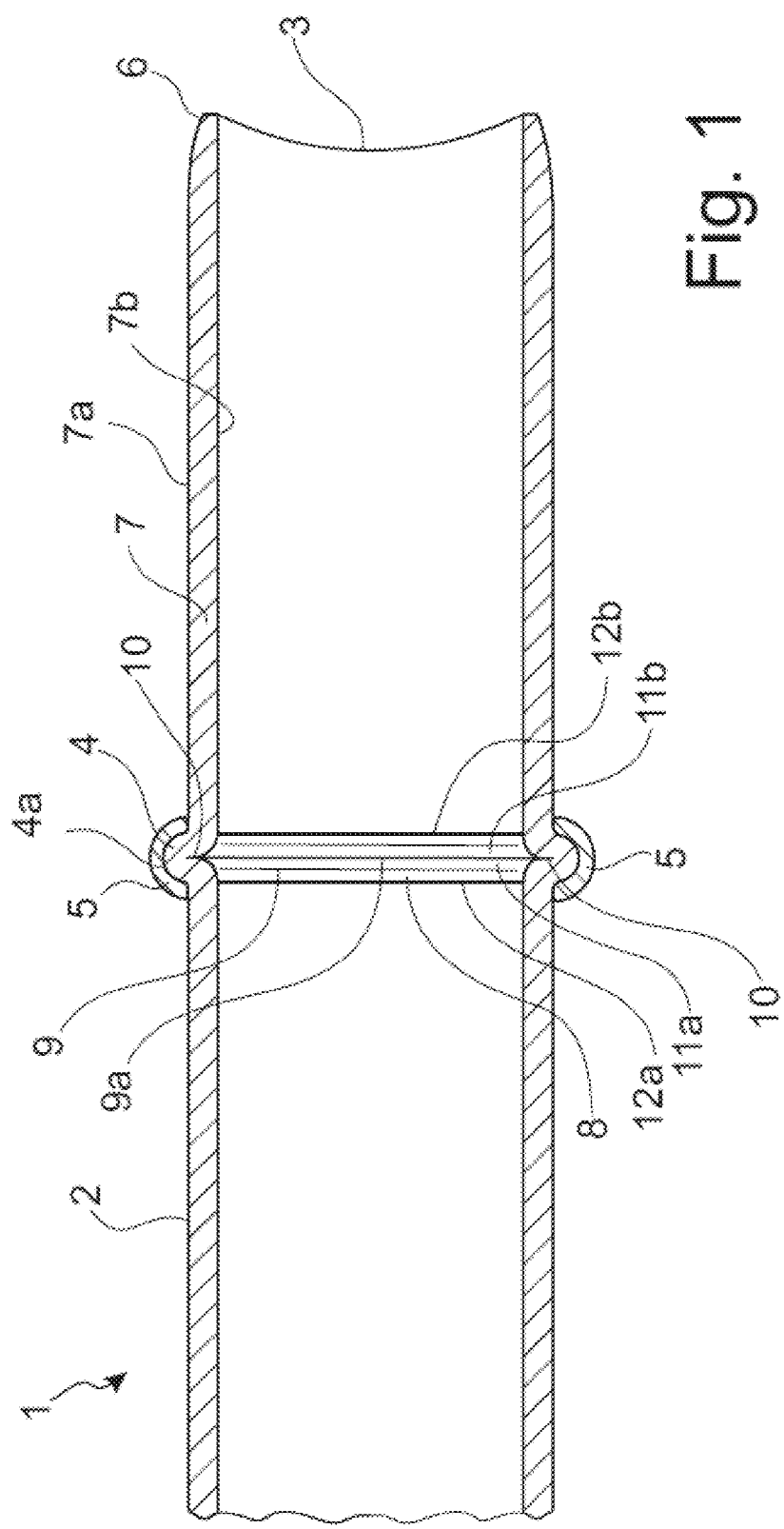
FIG. 1: A longitudinal cross section of a fluid pipe in the area of a pipe coupling section.

FIG. 1 shows a longitudinal cross section of a fluid pipe 1 for a heating and air conditioning unit, wherein a pipe coupling section 2 is presented in detail in this sectional view. The fluid pipe 1 is produced at least predominantly from plastic. The pipe coupling section 2 is located in the area of a mouth of the pipe 3, wherein a circumferential bead 4 produced from plastic is constructed around the circumference of the pipe and protrudes outwards in the pipe coupling section 2. A circumferential ring 5, which runs around the entire circumference of the pipe and is preferably produced from aluminum or an aluminum alloy, is attached to the bead 4 here. The polymer bead 4 and the ring 5 do not adjoin a front edge 6 that itself adjoins the mouth of the pipe 3, but rather are set at a distance from the front edge 6.

As shown in FIG. 1, the ring 5 exhibits a U-shaped cross section, which corresponds to the cross section of the polymer bead 4 and precisely encapsulates the bead 4. With an existing connection of the fluid pipe 1 to a quick connector or a different type of connector (not shown), the metal ring 5 attached to the bead 4 prevents the connection of the reinforced bead to the connector from being disconnected thanks to the associated strengthening of the polymer bead 4. The ring 5 therefore largely secures correct functioning of the bead 4, even when a traction force is applied or when increased internal pressure or increased temperatures are encountered.

According to the embodiment shown in FIG. 1, the bead 4 is constructed by reshaping the pipe wall 7 in a reshaping area 8. In this reshaping area 8, the circumferential bead 4 on the outer wall of the pipe 7a is positioned opposite a circumferential recess 9 in the inner wall of the pipe 7b. According to the embodiment shown, the reshaping is a fold and the reshaping area 8 is a folding zone 8, wherein the circumferential recess 9 is constructed as a circumferential groove 9 with an—also circumferential—central fold 10 in the position of a maximum recess 9a in the inner wall of the pipe 7b. The position of the maximum recess 9a in the inner wall of the pipe 7b is opposite the position of a maximum bead diameter 4a on the outer wall of the pipe 7a, wherein the surfaces are predominantly in contact with or are pressed against one another on both sides of the central fold 10 at these adjoining areas 11a, 11b of the circumferential groove 9. The adjoining areas 11a, 11b can also be in full contact with one another. The circumferential groove 9 would then encompass three circumferential parallel folds, wherein two outer folds would be constructed in the position of the outer edges 12a, 12b of the circumferential groove 9 on both sides of the central fold 10 and would also be in contact with one another.

Figure 2:
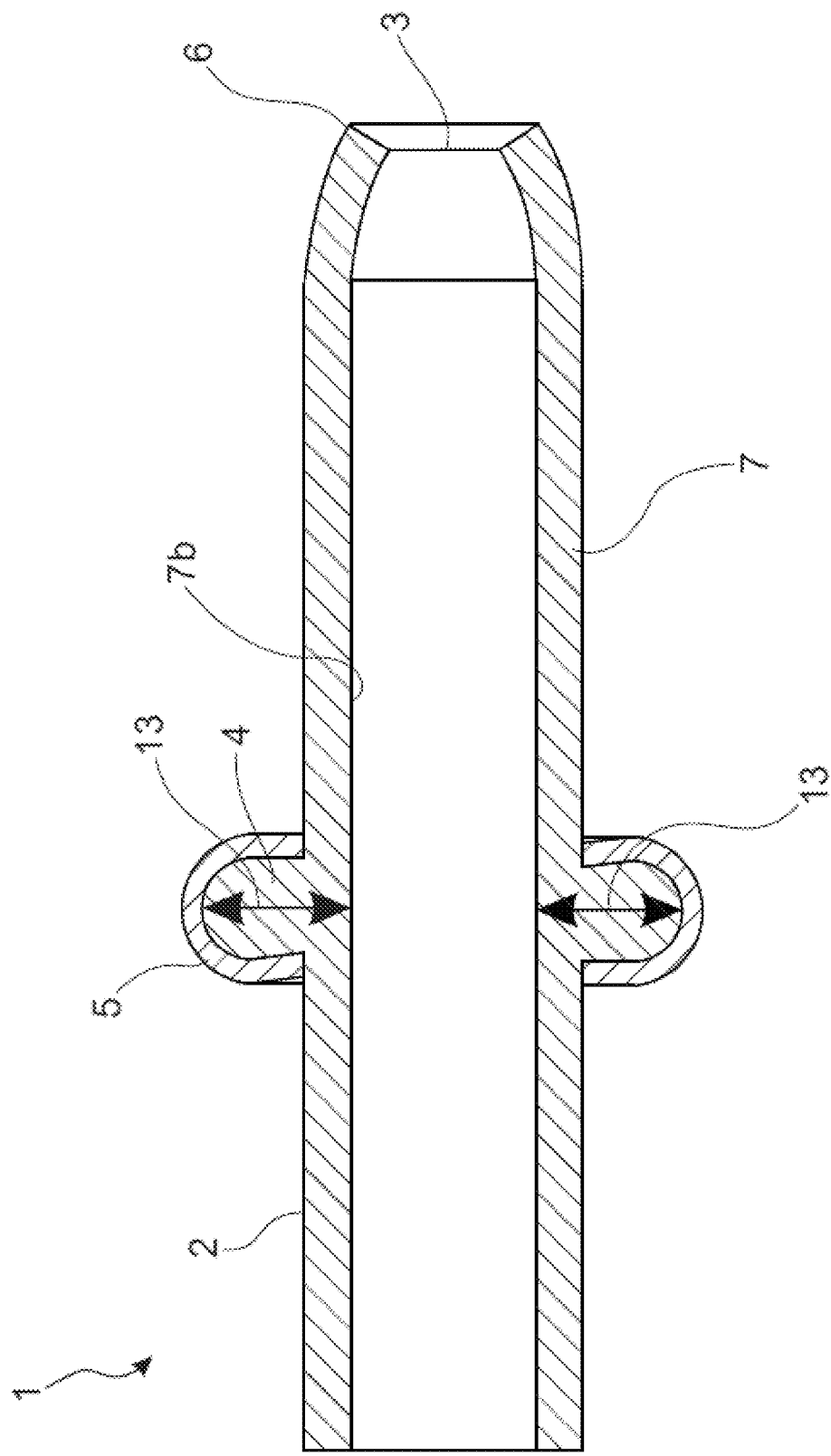
FIG. 2: A longitudinal cross section of a fluid pipe in the area of a pipe coupling section according to an alternative embodiment.

FIG. 2 shows a longitudinal cross section of a fluid pipe 1 for a heating and air conditioning unit according to an alternative embodiment. A pipe coupling section 2 is also presented in detail in this sectional view. The fluid pipe 1 is produced predominantly from plastic. The pipe coupling section 2 is located in the area of a mouth of the pipe 3, wherein a circumferential bead 4 produced from plastic is constructed around the circumference of the pipe and protrudes outwards in the pipe coupling section 2. A circumferential ring 5, which runs around the entire circumference of the pipe and is preferably produced from aluminum or an aluminum alloy, is attached to the bead 4 here. The polymer bead 4 and the ring 5 do not adjoin a front edge 6 that itself adjoins the mouth of the pipe 3, but rather are set at a distance from the front edge 6.

As shown in FIG. 2 the ring 5 exhibits a U-shaped cross section, which corresponds to the cross section of the polymer bead 4 and precisely encapsulates the bead 4. In contrast to the embodiment shown in FIG. 1, FIG. 2 shows a bead 4 that—without a circumferential groove on the inner wall of the pipe 7b—is constructed solely as a circumferential thickening (reinforcement) 13 of the pipe wall 7 around the circumference of the pipe.

FIG. 3 shows a schematic side view of the pipe coupling section 2 of the fluid pipe. The metallic ring 5, which is set away from the limiting front edge 6 of the mouth of the pipe 3, completely covers the non-visible bead in this depiction. As also shown in FIG. 3, the mouth of the pipe 3 is constructed with a taper in its end section towards the limiting front edge 6 relative to the remaining diameter of the pipe coupling section 2.

LIST OF REFERENCE NUMBERS

1 Fluid pipe
2 Pipe coupling section
3 Mouth of the pipe
4 Bead
4a Position of a maximum bead diameter
5 Ring
6 Front edge
7 Pipe wall
7a Outer wall of the pipe
7b Inner wall of the pipe
8 Reshaping area, folding zone
9 Circumferential recess, circumferential groove
9a Maximum recess
10 Central fold
11a Areas adjoining the central fold
11b Areas adjoining the central fold
12a Outer edge of the circumferential groove
12b Outer edge of the circumferential groove
13 Circumferential thickening

The invention claimed is:

1. A fluid pipe for a heating and air conditioning unit, the fluid pipe comprising:
a pipe coupling section produced at least predominantly from plastic in an area of a mouth of the pipe, wherein a circumferential bead made of plastic and protruding outwards is constructed in a coupling section of the pipe around a circumference of the pipe, and wherein a circumferential ring made of metal or a metal alloy is attached to the bead around the circumference, wherein the ring is produced from aluminum or an aluminum alloy.

2. The fluid pipe according to claim 1, wherein the ring has a cross section that corresponds to a cross section of the bead and encapsulates the bead at least in part.

3. The fluid pipe according to claim 2, wherein the cross section of the ring is U-shaped.

4. The fluid pipe according to claim 1, wherein the bead and the ring do not adjoin a front edge that restricts the mouth of the pipe, but are rather set at a distance from the front edge.

5. The fluid pipe according to claim 1, wherein the mouth of the pipe towards a limiting front edge is constructed with a taper at least in certain areas relative to a remaining diameter of the coupling section of the pipe.

6. A fluid pipe for a heating and air conditioning unit, the fluid pipe comprising:

a pipe coupling section produced at least predominantly from plastic in an area of a mouth of the pipe, wherein a circumferential bead made of plastic and protruding outwards is constructed in a coupling section of the pipe around a circumference of the pipe, and wherein a circumferential ring made of metal or a metal alloy is attached to the bead around the circumference, wherein the bead is constructed by a reshaping a wall of the pipe in a reshaping area, wherein the bead along the circumference of the pipe at an outer surface of the wall is positioned opposite a circumferential recess in an inner surface of the wall of the pipe.

7. The fluid pipe according to claim 6, wherein the reshaping is a fold and the reshaping area is a folding zone, wherein the circumferential recess is constructed as a circumferential groove with a circumferential central fold in a position of a maximum recess in the inner surface of the wall of the pipe and that the position of the maximum recess in the inner surface of the wall of the pipe is opposite a position of a maximum bead diameter on the outer surface of the wall of the pipe, wherein the inner surface of the wall of the pipe forming the recess and the outer surface of the wall of the pipe forming the bead are at least partially in contact with one another on both sides of the central fold in adjoining areas of the circumferential groove.

8. The fluid pipe according to claim 7, wherein the circumferential groove further comprises three circumferential parallel folds, wherein two outer folds of the parallel folds on two outer edges are constructed on both sides of the central fold of the circumferential groove and the two outer folds are in contact with one another.

9. The fluid pipe according to claim 1, wherein the bead is constructed as a thickening of a wall of the pipe that runs around an entirety of the circumference of the pipe.

\* \* \* \* \*